(12) United States Patent
Wood et al.

(10) Patent No.: US 6,895,557 B1
(45) Date of Patent: May 17, 2005

(54) WEB-BASED MEDIA SUBMISSION TOOL

(75) Inventors: Lisa T. Wood, Danville, CA (US); Scott M. Lewis, Danville, CA (US); Robin T. Fried, Berkeley, CA (US)

(73) Assignee: IPIX Corporation, San Ramone, CA (US)

( * ) Notice: Subject to any disclaimer, the term of this patent is extended or adjusted under 35 U.S.C. 154(b) by 0 days.

(21) Appl. No.: 09/357,836

(22) Filed: Jul. 21, 1999

(51) Int. Cl.$^7$ ................................................ G09G 5/00
(52) U.S. Cl. .................... 715/744; 715/748; 715/769; 707/102; 709/236
(58) Field of Search .......................... 707/1, 10, 3, 4, 707/2, 100, 102, 513, 523, 101; 345/418, 473, 769, 770, 744; 709/219, 246, 232; 382/305

(56) References Cited

U.S. PATENT DOCUMENTS

| | | | |
|---|---|---|---|
| 5,001,628 A | 3/1991 | Johnson et al. | 364/200 |
| 5,327,265 A | 7/1994 | McDonald | 358/527 |
| 5,555,388 A | 9/1996 | Shaughnessy | 395/427 |
| 5,678,046 A | 10/1997 | Cahill et al. | 395/616 |
| 5,760,917 A | 6/1998 | Sheridan | 358/442 |
| 5,761,404 A | 6/1998 | Murakami et al. | 395/182 |
| 5,781,773 A * | 7/1998 | Vanderpool et al. | 395/611 |
| 5,799,063 A | 8/1998 | Krane | |
| 5,813,009 A | 9/1998 | Johnson et al. | 707/100 |
| 5,819,032 A * | 10/1998 | De Vries et al. | 709/250 |
| 5,845,299 A * | 12/1998 | Arora et al. | 707/513 |
| 5,890,170 A * | 3/1999 | Sidana | 707/501 |
| 6,012,068 A * | 1/2000 | Boezeman et al. | 707/104 |
| 6,017,157 A | 1/2000 | Garfinkle et al. | 396/639 |
| 6,028,603 A * | 2/2000 | Wang et al. | 345/350 |
| 6,035,323 A * | 3/2000 | Narayen et al. | 709/201 |
| 6,202,061 B1 * | 3/2001 | Khosla et al. | 707/3 |
| 6,301,607 B2 * | 10/2001 | Barraclough et al. | 709/204 |
| 9,381,029 * | 4/2002 | Tipirneni | 358/1.14 |
| 6,489,980 B1 * | 12/2002 | Scott et al. | 345/854 |
| 6,505,160 B1 * | 1/2003 | Levy et al. | 704/270 |
| 6,516,340 B2 | 2/2003 | Boys | |

FOREIGN PATENT DOCUMENTS

| | | | |
|---|---|---|---|
| EP | 0930 774 A2 | 7/1999 | H04N/1/21 |

OTHER PUBLICATIONS

Thilo Horstmann and Richard Bentley, "Distributed Authoring on the Web with the BSCW Shared Workspace System," StandardView vol. 5, No. 1, pp. 9–16, Mar. 1997.*
Doug Dean, 15 Seconds: Down and Dirty Browser Uploading with a VB ASP Component, pp. 1–10, Mar. 11, 1999.*
Peter Persits, 15 Seconds: Browser–based uploading Under the Microscope, pp. 1–7, Nov. 21, 1998.*
Netscape Communications Corp., Help File of Netscape Composer 4.75, Copyright 1994–1998, p. 9.*

* cited by examiner

Primary Examiner—John Cabeca
Assistant Examiner—Tadesse Hailu
(74) Attorney, Agent, or Firm—Frost Brown Todd LLC

(57) ABSTRACT

The present invention, generally speaking, provides an improved web-based media submission tool. As with some existing tools, operation of the tool is drag and drop or the user can "click" to browse a directory to select media objects. Unlike existing tools, the tool provides the user an opportunity to confirm the submission, for example by generating a thumbnail image of an image file that has been dragged and dropped. Batch submission is provided for in which a user drags and drops a plurality of images or other media objects. Submission from a web page to a web page is also provided for. The submission tool is configurable to perform a variable amount of intellegent preprocessing on media objects prior to upload. In the case of digital images, the tool can perform sizing and formatting, for example. Information capture is performed with information being uploaded together with the media objects. In an exemplary embodiment, information capture is both user-transparent (e.g., user ID and/or password) and user-visible (e.g., the user can provide captions for media objects). The submission of information about the user and the media objects facilitates automatic integration of the media objects within existing databases.

74 Claims, 5 Drawing Sheets

Homes Realtor Services

Getting Started | Send Photos | Homes | Financing | Offer & Closing | Help

Adding Photos to your listings

Get better exposure for your listings by including some pictures of the property. Its easy! Just locate the folder on your computer containing your photos, and then drag them into the boxes below. Select a descriptive caption for each photo and then click the "Send Photos" button.

*Frequently Asked Questions* ⓘ

[Drag Photo Here | Front View ▽]  [Drag Photo Here | Front View ▽]  [Drag Photo Here | Front View ▽]  [Drag Photo Here | Front View ▽]

Listing Name [_____]   [Send Photos]

Today's Rates
30-Year Fixed    6.75%
15-Year Fixed    6.45%
1-Year Adjustable 5.6%
*National average rates
[Find a Loan] [Rate News]

Highlights
Welcome to Homes!
We hope you enjoy our site
Please send us your feedback

Home & Rate Trackers
Receive free e-mail updates

*FIG. 1*

PWImageControl Interface:

| Interface Name | Type | Definition | Signature |
|---|---|---|---|
| ScaleImage | function | Scales an image in place or to a temporary file | ScaleImage(<br>  destinationType as String,<br>  changeDimensions as Integer,<br>  destWidth As Integer,<br>  destHeight As Integer,<br>  destQuality As Integer, '0-100<br>  generateOutputFilename As Boolean ' create tempfile<br>) As String |
| DelTempFile | sub | Deletes temporary file created with ScaleImage | DelTempfile() |
| fileName | String property | Name of file shown in image well | fileName as String |
| imageName | String property | String value from image caption box | imageName as String |
| ClearImage | sub | Clears the image from the display and redisplays the logo and instructional text | ClearImage() |
| backgroundColor | String property | Hexideciaml RGB string value in format "FFFFFF" or "#FFFFFF" | backgroundColor as String |
| textColor | String property | Hexidecioml RGB string value in format "FFFFFF" or "#FFFFFF" | textColor as String |

FIG. 3

PWMediaSendControl Interface:

| Interface Name | Type | Definition | Signature |
|---|---|---|---|
| SubmitMediaRequest | function | Transfers image and returns a status code. The action is successful if the return code is 0. If non-zero return code examine ServerRetString for a reason. | SubmitMediaRequest(<br>UserID As String, 'partner UID<br>Password As String, 'partner password<br>ServiceType As String, '"HOST" or "MIRROR"<br>IndustryCode As Integer, 'e.g., 65=real estate<br>MediaType As Integer, '1=image 2=video 3=sound<br>OpCode As Integer, '1=Add, 2=Update, 3=Delete<br>IPAddr As String, 'Destination IP address<br>filename As String, 'File to send<br>MediaGroupID As String, 'Used to build unique key<br>MediaExtendedID As String, '""<br>MediaSequenceNum As Integer,<br>Desc1 As String, '255 chars<br>Desc2 As String, '255 chars<br>Desc3 As String<br>preScaled as Integer) as Integer '255 chars |
| ServerRetString | String property | Return value from SubmitMediaRequest. If call made on HOST service, this string contains the IMG SRC url | ServerRetString as String |

FIG. 4A

```
Usage Example (VB Script)
tempFileName=DragImage1.ScaleImage(320, 240, 89, 1)  'scale the image object 'DragImage1'
result=UplHandler.SubmitMediaRequest(                 'transmit to mod central
    UserID,
    Password,
    ServiceType,
    0,
    1,
    1,
    ipAddress,
    tempFileName,
    misNum.Value,
    zipcode,
    imageCount,
    title,
    desc2,
    desc3,
    1)

DragImage3.DelTempFile    'delete the temp file
```

WEB-BASED MEDIA SUBMISSION TOOL

The present application is related by subject matter to U.S. application Ser. No. 09/440,461, now U.S. Pat. No. 6,732,162.

BACKGROUND OF THE INVENTION

1. Field of the Invention

The present invention relates to the handling, manipulation and processing of digital content and more particularly to the transportation and Internet publishing of digital content, particularly image media objects and rich media.

2. State of the Art

Much of the phenomenal success of the web is attributable to its graphical nature. Literally, a picture is worth a thousand words. The capture of digital images has become routine, using digital cameras and scanners. Nevertheless, although the handling of images by website creators has achieved a high degree of automation, for the average technology user (the "imaging civilian"), manipulating and sharing digital images over the Internet remains a cumbersome and daunting process. Piecemeal solutions that have been devised for handling digital images require a level of sophistication that is beyond that of the ordinary user. For example, transferring a digital image may require first downloading a FTP program, then installing it, then running it and connectting to an FTP server by typing the server name in the connection dialog, then navigating to the proper subdirectory, selecting the files to be uploaded, making sure that the program is in binary transfer mode, then sending the files. For the imaging civilian, such an involved process can be daunting to say the least.

Additionally, as technologies advance and casual users begin to experiment with other media objects, such as streaming video, 3D objects, slide shows, graphics, movies, and even sound files that accompany imaging data, the processes required to share these rich media types on the Internet becomes exponentially more complicated and prohibitive. As the realization of the Internet as an interactive, content rich medium becomes more and more a reality, the need for enabling the use and distribution of rich content and media on the Internet will become the gating factor to its long term success.

A broad-based solution to the foregoing problem requires a web-based media submission tool that allows for submission of media objects in a convenient, intuitive manner. A company named Caught in the Web, has attempted to create a broad-based media submission tool known as "ActiveUpload". ActiveUpload allows an arbitrary file to be dragged and dropped onto a web page control for upload to the web server. An ActiveUpload control allows users to, without leaving a web page, transfer files to a server (Internet or intranet) by selecting the files on the user's desktop that the user wants to transfer, then dragging them onto the web page. For example, a user, having visited a web page, can contribute pictures, documents, zip files, etc., without having to leave the web page and use an FTP program. Standard web authoring tools can be used to integrate ActiveUpload into web pages and change the behavior of the control.

Although Caught in the Web's ActiveUpload tool simplifies the user experience, it does little toward furthering "backend" automation in the handling and distribution of media objects and has no built in "intelligence" to streamline the process of handling and transporting rich media objects from the front end.

SUMMARY OF THE INVENTION

The present invention, generally speaking, provides an improved web-based media submission tool. As with some existing tools, operation of the tool is drag and drop or the user can "click" to browse a directory to select media objects. Unlike existing tools, the tool provides several unique and valuable functions. For example, the tool provides the user an opportunity to confirm the submission with a visual representation, for example by generating a thumbnail image of the rich media file that has been selected. Additionally, batch submission is provided to allow a user to drag and drop or select a plurality of images or other media objects. Submission from a web page to a web page is also provided for. Even more importantly, the submission tool is configurable to perform a variable amount of intelligent preprocessing on media objects prior to upload. In the case of digital images, the tool can perform sizing and formatting, for example. Information capture is performed with information being uploaded together with the media objects. In an exemplary embodiment, information capture is both user-transparent (e.g., user ID and/or password) and user-visible (e.g., the user can provide captions for media objects). The submission of information about the user and the media objects facilitates automatic integration of the media objects within existing databases.

BRIEF DESCRIPTION OF THE DRAWING

The present invention may be further understood from the following description in conjunction with the appended drawing. In the drawing:

FIG. 1 is a diagram of an exemplary web page providing media object acquisition functions;

FIG. 3 is a table pertaining to a first portion of the Prepare and Post component design.

DETAILED DESCRIPTION OF THE PRFERRED EMBODIMENTS

Figure 2:
FIG. 2 is a diagram of another exemplary web page providing image acquisition functions.

The following describes the Prepare and Post™ tools, which prepares and submits media objects from inside a standard browser, referred to as the first location, to a second location or server. The media objects may be pictures (images), movies, videos, graphics, sound clips, etc. Although in the following description the submission of images is described in greatest detail, the same principles apply equally to media obejcts of all descriptions.

The Prepare and Post tools refers to browser-side components which together provide the ability to submit and transport media objects over the web to be stored and served. Using the Prepare and Post tools, end users can submit images in an immediate, intuitive manner. No technical sophistication is required. In particular, understanding technical terms such as JPEG, resolution, pixel, kilobyte, transfer protocol, IP address, FTP etc., is not required, since the Prepare and Post tools handles all of these tasks for the user. The benefits of the Prepare and Post tool are:

a) to the image submitter, the ability to submit media objects to web pages immediately without needing to overcome technical obstacles;

b) to the image submitter, the ability to submit media objects to web pages "as is" without making modifications to the media objects prior to sending.

c) to PictureWorks web site partner, access to a uniform, standardized, reliable and secure channel for media acquisition;

d) to PictureWorks web site partner, access to contributed media "made to order", it meets their imaging specifications every time without human intervention;

e) to PictureWorks web site partner, the ability to provide web site visitors with an easy, error free way to contribute media;

f) to PictureWorks web site partner, access to contributed media in "real time" with no time delays.

The two primary components used in the Prepare and Post tools which carry out these functions are 1) the media object identifier and 2) the media sender.

In general, the media object identifier functions to provide a graphical interface for placing and associating a media object from a user's desktop onto a web page. The media sender carriers out the function of transmitting media objects to a second location.

There are two ways media objects on the first location become associated with a media object identifier. The first is through a "drag and drop" behavior where the user clicks on a media object to select the one they want to submit. The media object is then dragged to the media object identifier. Releasing the mouse button associates the media object with the media object identifier. This behavior is allowed in web browsers that support drag and drop functionality. The Prepare and Post tools enable these browsers to accept media objects via drag and drop by providing the media object identifier as an ActiveX component.

The second way to associate a media object on the first location with the media object identifier is to click on the media object identifier to browse for media objects, then select the media object of choice. This method is made available for web browsers where the media object identifier needs to be a pure Java component. (Such "signed applet browers" like Netscape Navigator) In this instance, the user may be asked to choose a media object in a similar manner as when choosing a file to be opened, either by graphical navigation or by specifying a path name. For example, a prompt associated with the media object identifier may be displayed prompting the user to click within the media object identifier. Clicking within the media object identifier brings up a browse dialog. Using the browse dialog, the user selects the desired media object, which is then placed in the media object identifier. The Prepare and Post tools will generate a visual representation or thumbnail of the media object, a feature currently not available in signed applet browsers.

Real estate is an example of a prime application of the Prepare and Post tools. "Curb appeal" is of great importance in the realty industry and can only be judged by "drive-bys," which are time-consuming and laborious, or by the availability of images. The Prepare and Post tools make real estate images readily available with a minimal amount of effort.

Referring to FIG. 1, an example is shown of a realty web page featuring the described Prepare and Post tools functionality. The user associates images with a media object identifier via the methods described above and selects appropriate captions for the images, e.g., living room, family room, etc. The captions may be typed in or selected from menus. The user also supplies identifying information, in this instance the MLS listing number. When the user clicks the Send button, the images are uploaded and processed immediately according to the configuration of the Prepare and Post tools.

The Prepare and Post tools also support a batch interface, allowing a plurality of images to be submitted simultaneously as in the case of a professional photographer, for example. The opportunity for user confirmation is again provided, e.g., by displaying a visual representation of the images in the batch.

If a mistake is made such that the wrong image is placed in a media object identifier, the correct image may be placed in the media object identifier. The correct image will replace the mistaken image. Alternatively, the user may remove an image from a media object identifier by right-clicking on the media object identifier and selecting Remove within a resulting pop-up menu.

Note that any number of media object identifiers may be provided on a web page and that the media object identifiers may be separate or grouped. This is evident in FIG. 2. The number of media object identifiers provided on a page can be pre-configured and fixed, allowing no user intervention, or the media object identifiers can be generated dynamically, allowing the user to determine how many media object identifiers they need for media submission. FIG. 2 shows a web page with various sizes of media object identifiers. If a media object identifier is separate, its image will be transmitted separately to the second location. If an media object identifier is part of a group, its image will be transmitted to the second location as part of a group of images that are stored together and cataloged together. Media object identifiers that are associated together as a group are noted as such in the web page interface and transparently in the media object identifier object code. Moreover, a web page may have multiple groups of media object identifiers, or "groups of groups."

The usefulness of images is greatly enhanced by capturing and identifying information about the images and submitting the identifying information with the images. Information may be image-specific, user-specific or both. The submission of information about the user and the media objects facilitates automatic integration of the media objects within existing databases. Information capture may be overt or covert or both. This unique automatic database integration enables the images to be served with the proper web page data. Overt information capture relies upon the user to make menu selections of appropriate captions as illustrated in FIG. 1, or to make text entries within text fields, or both. The Prepare and Post tools are easily customized to accept menu selections and text fields for different applications. Covert information capture occurs by having the web browser automatically pass to the Prepare and Post tools known information such as a user ID or, password used to access the web page.

A key differentiator of the Prepare and Post tools is the browser, or client-side intelligence built into the tools. This intelligence directly provides features including those already outlined such as associating data with media objects, generating a visual representation of the media objects and generating media object identifiers dynamically or in a pre-set manner. Other features are also provided via this intelligence, specifically, the ability to control the width and height of the media object identifier and the ability to preprocess the media objects in any number of ways prior to transporting to a second location. In the case of an image media object for example, the Prepare and Post tools may resize the image, (i.e., increase or decrease its size as defined by either physical dimensions, pixel count, or kilobytes). Compression, for example, is a type of sizing. The Prepare and Post tools may also change the image's file format (a way of a media object being identified as to a "type" or "kind" of media), change the quality setting of the image, crop the image or change the aspect ratio, add text or annotations, encode or combine (including stitching) the media object, or enhance the media object by changing image values, for example, relating to contrast or saturation. This intelligence may be executed in a manner that is transparent to the end user. This transparency allows the end user to submit media to the Prepare and Post tools "as is," since the tools will automatically prepare it to meet the requirements of the second location. Note that, although image submission may involve client-side processing, image processing is not required.

The Prepare and Post tools are available for customers to integrate into their own web pages. The Prepare and Post tools are easily integrated into web sites (customers) to allows those sites to accept media objects from web site visitors (users). Appendix A is a generic HTML HostTemplate illustrating how Prepare and Post components are integrated into a web page. The HTML template file (which is a complete working example) contains instructions and a few small code snippets that the customer pastes into the web page. Integrating the Prepare and Post components requires an Initialization Section, a Configuration Section, an ImageWell (media object identifier) Section, a Submission Section and an ImageUpLoad Control Section. To include the Prepare and Post tools media object identifiers on a web page, the customer cuts and pastes code snippets for these sections from the template into the web page.

The Initialization Section consists of a few lines of JavaScript code that will download all of the needed Prepare and Post submission components.

The Configuration Section overrides various configurable default settings that the customer can control. In the Configuration Section, the media object identifier component is sized and configured to perform any preprocessing of the image that may be desired prior to upload. Configurable parameters include both fixed values for all submissions (per submission values) and fixed values for all images within a submission (per image values), as will be explained presently.

Fixed values for all submissions include DefaultImageWidth and DefaultImageHeight, as well as include DefaultControlWidth and DefaultControlHeight. The former specify the default width and height of the images after they have been compressed for transmission. The latter specify the default width and height of all media object identifiers. To create media object identifiers having different sizes, the customer specifies the desired size when creating the media object identifier. Another fixed value for all submissions is Quality. This determines the quality level of the images after they have been compressed for transmission (0 is the lowest quality/highest compression and 100 is the highest quality/lowest compression).

Fixed values for all media objects within a submission include Key1 and Key2. Key1 is the primary value that determines the filename of the resulting image file and, consequently, its URL. It is important that each submitted image have a unique name to prevent one image from overwriting another. Key2 is an optional secondary key that is appended to Key1 before the image's filename and URL are created. While default values for Key1 and Key2 can be specified in the configuration section, more likely this value will be supplied from a field in the web form. If the web page form contains a control named "Key1," then its value will be used for this key. For example, the field Key1 might be labeled as "MLS Number" on the web page. Similarly, the field Key2-might be labeled "Zip Code" on the web page. A sequence number is appended to the Key1/Key2 combination. When there are multiple media object identifiers on a page, this will ensure that each image has a unique key.

All media object identifiers on a web page must be contained within an HTML form. A single line of JavaScript code is inserted into the web page (within the HTML form) in each place where a media object identifier is desired. The Media object identifier Section can specify the width and height for each media object identifier. If the width and height are omitted, then the default width and heigth from the Configuration Section are used.

The Submission Code Section contains HTML code that creates the button that submits both the images to the second locations and the form to the customer's server. Within the Submission Code Section, an HTML "href" parameter is required for the Send Button that causes the images to be sent. After the images have been sent, the web page form will be submitted in the standard manner. The form must define two hidden fields named "url" and imagecount." The imagecount field will contain the number of images actually transmitted. In an exemplary embodiment, the URL for images 2 through "n" are generated by replacing the initial sequence number at the end of the returned URL with the desired image number.

The ImageUpload Control Section holds a small piece of JavaScript code that is placed at the very end of the body section of the web page. This code creates the non-visible Image Upload control, or media sender, that performs the transfer of images from the user's machine to the second location.

The Prepare and Post components support multiple browsers and dynamically adjust their behavior according to the type of browser that is currently running. For example, under supported versions of Microsoft's browsers, media object identifiers are implemented as ActiveX controls, while under supported Netscape browsers, media object identifiers are implemented as Java Applets. This multiple browser support is completely automatic.

Figures 4, 4B:
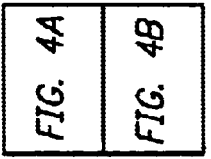
FIG. 4 is a table pertaining to a second portion of the Prepare and Post component design.

FIGS. 3 and 4 present further details of the media object identifier and media sender components, respectively.

From the foregoing description, it will be appreciated that the present media submission tool, besides offering convenience to the end user, offers convenience and flexibility to technology partners. In particular, web page integration is designed to facilitate automatic server-side integration of media content.

It will be apparent to those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

APPENDIX A

HostTemplate generic.htm

```
<HTML>
<HEAD>
<!--*********************************** Begin Initialization Section -->
<!--***** This section of code must appear at      -->
<!--***** the beginng of the <HEAD> section of     -->
<!--***** your web page. Copy this code and        -->
<!--***** paste it directly into your web page.    -->
<SCRIPT type="text/javascript" src="http://157.22.134.49/company/pwtcomponents.js"> </SCRIPT>
<SCRIPT type="text/javascript" src="http://157.22.134.49/company/company.js"> </SCRIPT>
<!--*********************************** End Initialization Section -->
</HEAD>
<BODY>
<!--*********************************** Begin Configuration Section -->
<!--***** This section of code must appear         -->
<!--***** anywhere after the initialization        -->
<!--***** section (above), and before the          -->
<!--***** the <FORM> that contains the image       -->
<!--***** wells.                                   -->
<!--*****                                          -->
<!--***** This section defines data values         -->
<!--***** needed by the image wells. You can       -->
<!--***** modify these values to suit              -->
<!--***** your needs.                              -->
<SCRIPT Language="Javascript">
PWT.Key1 = "name-your-image here";    // If the <FORM> contains fields named 'Key1'
PWT.Key2 = " ";                       //  & 'Key2' their values will be used.
PWT.Quality = 93;
PWT.DefaultImageWidth = 640;
PWT.DefaultImageHeight = 480;
PWT.DefaultControlWidth = 326;        // Includes a 3 pixel border
PWT.DefaultControlHeight = 246;       // Include a 3 pixel border
</SCRIPT>
<!--*********************************** End Configuration Section -->
<FORM>
This sample displays a working image well.
<BR>
<!--*********************************** Begin ImageWell Section -->
<!--***** This code creates an image well on       -->
<!--***** the web page. While this template        -->
<!--***** only contains a single image well,       -->
<!--***** you can use as many as you like.         -->
<!--***** Copy this code into your web page        -->
<!--***** anywhere within your <FORM> where        -->
<!--***** you want an image well to appear.        -->
<SCRIPT Language="Javascript">
PWT.addimagecontrol( );               // or "PWT.addimagecontrol(640,480);" to override
                                      // the default width and height.
</SCRIPT>
<!--*********************************** End ImageWell Section -->
<BR>
This text is after the image well.
<P>
<!--*********************************** Begin Submission Code Section -->
<!--***** You can use any type of button you       -->
<!--***** wish, but rather than it being a         -->
<!--***** standard SUBMIT button, it must          -->
<!--***** instead contain the parameter:           -->
<!--*****                                          -->
<!--*****      onclick="PWT.Submit( )"             -->
<!--*****                                          -->
<!--***** (as shown in the example below).         -->
<!--***** After the images have been sent,         -->
<!--***** your web page FORM will be submitted     -->
<!--***** in the standard manner.                  -->
<!--*****                                          -->
<!--***** Your FORM must define two hidden         -->
<!--***** fields named "url" & "imagecount"        -->
<!--***** (see examples below). The "url"          -->
<!--***** field will be populated with the         -->
<!--***** resulting URL of the first (or only)     -->
<!--***** image submitted, and the "imagecount"    -->
<!--***** field will contain the number of         -->
<!--***** images actually transmitted. The URL     -->
<!--***** for images 2 thru n can be generated     -->
<!--***** by replacing the initial sequence        -->
<!--***** number (which will always be "1")        -->
<!--***** at the end of the returned URL with      -->
```

APPENDIX A-continued

HostTemplate generic.htm

```
-->
<!--***** the desired image number.            -->
<INPUT type="hidden" name="url">
<INPUT type="hidden" name="imagecount">
<INPUT type="button" value="Submit Images" onclick="PWT.Submit( )">
</FORM>
<!--********************************************* End Submission Code Section -->
<!--********************************************* Begin ImageUpload Control Section -->
<!--***** This section of code must appear at   -->
<!--***** the end of the <BODY> section of      -->
<!--***** your web page. Copy this code and     -->
<!--***** paste it directly into your web page. -->
<SCRIPT Language="Javascript">
PWT.adduploadcontrol( );
</SCRIPT>
<!--********************************************* End ImageUpload Control Section -->
</BODY>
</HTML>
```

What is claimed is:

1. A method comprising the steps of:

accessing at least one media object identifier, the media object identifier being embedded within a third-party web site, the media object identifier including a graphical user interface for acquiring media objects;

associating a media object with the media object identifier; and pre-processing the media object by the media object identifier for the requirements of the third-party web site, the pre-processing being done without additional user selection of the pre-processing.

2. The method of claim 1 wherein the pre-processing includes one of the following steps:

reducing the file size of the media object, compressing the media object for purposes of transportation, changing the file format of the media object, changing the aspect ratio or otherwise cropping the media object, adding text or other annotation to the media object, encoding or otherwise converting the media object, processing the media object in a manner that completely fills the media object identifier or maintains the aspect ratio of the media object within the media object identifier, changing the orientation or otherwise rotating the media object, combining (including stitching) of multiple media objects, or enhancing the image by changing its contrast or saturation values.

3. The methods of claims 1 or 2 wherein the media object is associated with the media object identifier by dragging a visual representation of the media object to the graphical user interface of the media object identifier.

4. The methods of claims 1 or 2 wherein the media object is associated with the media object identifier by browsing and selecting files.

5. The methods of claims 1 or 2 wherein more than one media object is associated or processed simultaneously.

6. The methods of claims 1 or 2 wherein more than one media object identifier is generated dynamically or generated from pre-set instructions.

7. The method of claim 1 wherein the pre-processing includes reducing the size of the media object.

8. The method of claim 1 wherein the pre-processing includes modifying the format of the media object.

9. The method of claim 1 wherein the media object identifier allows display of the media object in context on the web page.

10. The method of claim 1 wherein the media object is a digital image.

11. The method of claim 1, wherein the media object identifier is configurable to control the pre-processing.

12. The method of claim 11, wherein the media object identifier is configurable by operators of the third party web site to control the pre-processing.

13. The method of claim 1, wherein requirements relate to presentation requirements of the third party web site.

14. The method of claim 1, wherein the pre-processed media object is uploaded to a remote server which enables the media object to be displayed on the web site.

15. A method comprising the steps of:

accessing a web site containing a media object identifier, the media object identifier including a graphical user interface for acquiring media objects;

associating a media object with the media object identifier; and pre-processing the media object by the media object identifier for the requirements of a web site, the pre-processing including checking a file size of the media object and if the file size of the media object is larger than a predetermined maximum file size reducing the file size of the media object, the pre-processing being done without user selection of the pre-processing.

16. The method of claim 15 wherein the pre-processing further includes one of the following steps:

compressing the media object for purposes of transportation, changing the file format of the media object, changing the aspect ratio or otherwise cropping the media object, adding text or other annotation to the media object, encoding or otherwise converting the media object, processing the media object in a manner that completely fills the media object identifier or maintains the aspect ratio of the media object within the media object identifier, changing the orientation or otherwise rotating the media object, Combining (including stitching) of multiple media objects, or Enhancing the image by changing its contrast or saturation values.

17. The method of claim 15 wherein the media object is associated with the media object identifier by dragging a visual representation of the media object to the graphical user interface of the media object identifier.

18. The method of claim 15 wherein the media object is associated with the media object identifier by browsing and selecting files.

19. The method of claim 15 wherein more than one media object is associated or processed simultaneously.

20. The method of claim 15 wherein more than one media object identifier is generated dynamically or generated from pre-set instructions.

21. The method of claim 15 wherein the media object identifier allows display of the media object in context on the web page.

22. The method of claim 15 wherein the media object identifier is embedded in the web site.

23. The method of claim 15 wherein the media object is a digital image.

24. The method of claim 15, wherein the media object identifier is configurable to control the pre-processing.

25. The method of claim 24, wherein the media object identifier is configurable by operators of the web site to control the pre-processing.

26. The method of claim 15, wherein requirements relate to presentation requirements of the web site.

27. The method of claim 15, wherein the pre-uploaded processed media object is uploaded to a remote server which enables the media object to be displayed on the web site.

28. A computer readable medium containing a program adapted to implement the method of:

associating a media object with a media object identifier, the media object identifier being embedded within a third-party web site, the media object identifier including a graphical user interface for acquiring media objects; and pre-processing the media object by the media object identifier for the requirements of the third-party web site, the pre-processing being done without user selection of the pre-processing.

29. The computer readable medium containing a program of claim 28 wherein the pre-processing includes one of the following steps:

reducing the file size of the media object, compressing the media object for purposes of transportation, changing the file format of the media object, changing the aspect ratio or otherwise cropping the media object, adding text or other annotation to the media object, encoding or otherwise converting the media object, processing the media object in a manner that completely fills the media object identifier or maintains the aspect ratio of the media object within the media object identifier, changing the orientation or otherwise rotating the media object, combining (including stitching) of multiple media objects, or enhancing the image by changing its contrast or saturation values.

30. The computer readable medium containing a program of claim 28 wherein more than one media object identifier is generated dynamically or generated from pre-set instructions.

31. The computer readable medium containing a program of claim 28 wherein the pre-processing includes reducing the size of the media object.

32. The computer readable medium containing a program of claim 28 wherein the pre-processing includes modifying the format of the media object.

33. The computer readable medium containing a program of claim 28 wherein the media object is a digital image.

34. The computer readable medium containing a program of claim 28, wherein the media object identifier is configurable to control the pre-processing.

35. The computer readable medium containing a program of claim 34, wherein the media object identifier is configurable by operators of the third party web site to control the pre-processing.

36. The computer readable medium containing a program of claim 28, wherein requirements relate to presentation requirements of the third party web site.

37. A computer readable medium containing a program adapted to implement the method of:

associating a media object with a media object identifier at a web site, the media object identifier including a graphical user interface for acquiring media objects; and pre-processing the media object by the media object identifier for the requirements of a web site, the pre-processing including checking a file size of the media object and if the file size of the media object is larger than a predetermined maximum file size reducing the file size of the media object, the pre-processing being done without user selection of the pre-processing.

38. The computer readable medium containing a program of claim 37 wherein the preprocessing further includes one of the following steps:

compressing the media object for purposes of transportation, changing the file format of the media object, changing the aspect ratio or otherwise cropping the media object, adding text or other annotation to the media object, encoding or otherwise converting the media object, processing the media object in a manner that completely fills the media object identifier or maintains the aspect ratio of the media object within the media object identifier, changing the orientation or otherwise rotating the media object, combining (including stitching) of multiple media objects, or enhancing the image by changing its contrast or saturation values.

39. The computer readable medium containing a program of claim 37 wherein more than one media object identifier is generated dynamically or generated from pre-set instructions.

40. The computer readable medium containing a program of claim 37 wherein the media object identifier is embedded in the web site.

41. The computer readable medium containing a program of claim 37 wherein the media object is a digital image.

42. The computer readable medium containing a program of claim 37, which the media object identifier is configurable to control the pre-processing.

43. The computer readable medium containing a program of claim 42, wherein the media object identifier is configurable by operators of the web site to control the pre-processing.

44. The computer readable medium containing a program of claim 37, wherein requirements relate to presentation requirements of the web site.

45. A method comprising:

acquiring a media object with a web page displayed at a local computer;

pre-processing the media object at the local computer without user selection of the pre-processing, wherein the web page contains parameters used to control the pre-processing; and uploading the pre-processed media object from the local computer to a remote server.

46. The method of claim 45, wherein the web page includes an embedded graphical user interface for acquiring media objects.

47. The method of claim 46, wherein the graphical user interface embedded in the web page is positioned within a rectangular region of the web page display.

48. The method of claim 46, wherein the media object is acquired by a user dragging and dropping the media object into the graphical user interface.

49. The method of claim 46, wherein the graphical user interface can be used to select media objects from a file system of the local computer.

50. The method of claim 45, wherein the web page includes code for acquiring the media object.

51. The method of claim 50, wherein the code includes media object identifier.

52. The method of claim 51, wherein the media object identifier is an active X or Java applet component.

53. The method of claim 45, wherein the remote server enables the media object to be displayed in a destination web site.

54. The method of claim 45, wherein the pre-processing includes changing a file type of media object.

55. The method of claim 45, wherein pre-processing comprises resizing the media object.

56. The method of claim 45, wherein the local computer displays the web page using a browser.

57. The method of claim 45, wherein the media object is a digital image.

58. The method of claim 45, wherein the uploading is done after the user selects a submit button displayed on the web page.

59. The method of claim 58, wherein the pre-processing occurs after the user selects the submit button but before the uploading.

60. A computer readable medium containing a program adapted to implement a method of:

acquiring a media object with a web page displayed at a local computer;

pre-processing the media object at the local computer without user selection of the pre-processing, wherein the web page contains parameters used to control the pre-processing; and uploading the pre-processed media object from the local computer to a remote server.

61. The computer readable medium containing a program of claim 60, wherein the web page includes an embedded graphical user interface for acquiring media objects.

62. The computer readable medium containing a program of claim 61, wherein the graphical user interface embedded in the web page is positioned within a rectangular region of the web page display.

63. The computer readable medium containing a program of claim 61, wherein the media object is acquired by a user dragging and dropping the media object into the graphical user interface.

64. The computer readable medium containing a program of claim 61, wherein the graphical user interface can be used to select media objects from a file system of the local computer.

65. The computer readable medium containing a program of claim 60, wherein the web page includes code for acquiring the media object.

66. The computer readable medium containing a program of claim 65, wherein the code includes a media object identifier.

67. The computer readable medium containing a program of claim 66, wherein the media object identifier is an active X or Java applet component.

68. The computer readable medium containing a program of claim 60, wherein the remote server enables the media object to be displayed in a destination web site.

69. The computer readable medium containing a program of claim 60, wherein the pre-processing includes changing a file type of media object.

70. The computer readable medium containing a program of claim 60, wherein pre-processing comprises resizing the media object.

71. The computer readable medium containing a program of claim 60, wherein the local computer displays the web page using a browser.

72. The computer readable medium containing a program of claim 60, wherein the media object is a digital image.

73. The computer readable medium containing a program of claim 60, wherein the uploading is done after the user selects a submit button displayed on the web page.

74. The computer readable medium containing a program of claim 73, wherein the pre-processing occurs after the user selects the submit button but before the uploading.

* * * * *